Oct. 8, 1963 AKIRA KOBAYASHI ETAL 3,106,357

TAPE FEED MECHANISM

Filed March 7, 1962 2 Sheets-Sheet 1

INVENTORS
AKIRA KOBAYASHI
TOSHIO AOYAGI
SADAO ISHIHARA
BY
Ray C. Hapgood
ATTORNEY

TAPE FEED MECHANISM

Filed March 7, 1962 2 Sheets-Sheet 2

INVENTORS
AKIRA KOBAYASHI
TOSHIO AOYAGI
SADAO ISHIHARA
BY Ray C. Hapgood
ATTORNEY United States Patent Office
3,106,357
Patented Oct. 8, 1963

3,106,357
TAPE FEED MECHANISM

Akira Kobayashi, Toshio Aoyagi, and Sadao Ishihara, all of Tokyo, Japan, assignors to Nippon Electric Company Limited, Tokyo, Japan, a corporation of Japan
Filed Mar. 7, 1962, Ser. No. 178,059
6 Claims. (Cl. 242—55.12)

This invention relates to a novel tape feed mechanism, and more particularly to an improved magnetic tape feed mechanism which is useful in electronic computers and the like.

Generally speaking, when a magnetic tape unit is applied to the input of an electronic computer or the like, it is necessary for the tape unit to have a relatively fast tape feeding speed and a relatively short dead starting time. In order to satisfy this necessary condition, a loop of slack tape is usually provided in the tape feeding mechanism, which is controlled in accordance with the length of the slack tape loop to maintain a constant length of slack tape. With this ararngement, the tape driving means always works against the slack tape loop, which provides the short dead starting time and fast tape feeding speeds required in electronic computer applications. Although these prior art tape feed mechanisms were satisfactory in many respects, they had several serious drawbacks which were associated with their means for detecting the length of the slack type loop and controlling the tape feeding mechanism to maintain a constant length of slack tape.

Accordingly, one object of this invention is to provide a tape feed mechanism having an improved means for detecting the length of a slack tape loop.

Another object of this invention is to provide a tape feed mechanism having an improved means for maintaining a constant length of slack tape.

Another object of this invention is to provide a tape feed mechanism having a fast tape feeding speed and a short dead starting time.

Other objects and advantages of the invention will become apparent to those skilled in the art from the following description of one specific embodiment thereof, as illustrated in the attached drawings, in which.

Figures 1, 2A, 2B:
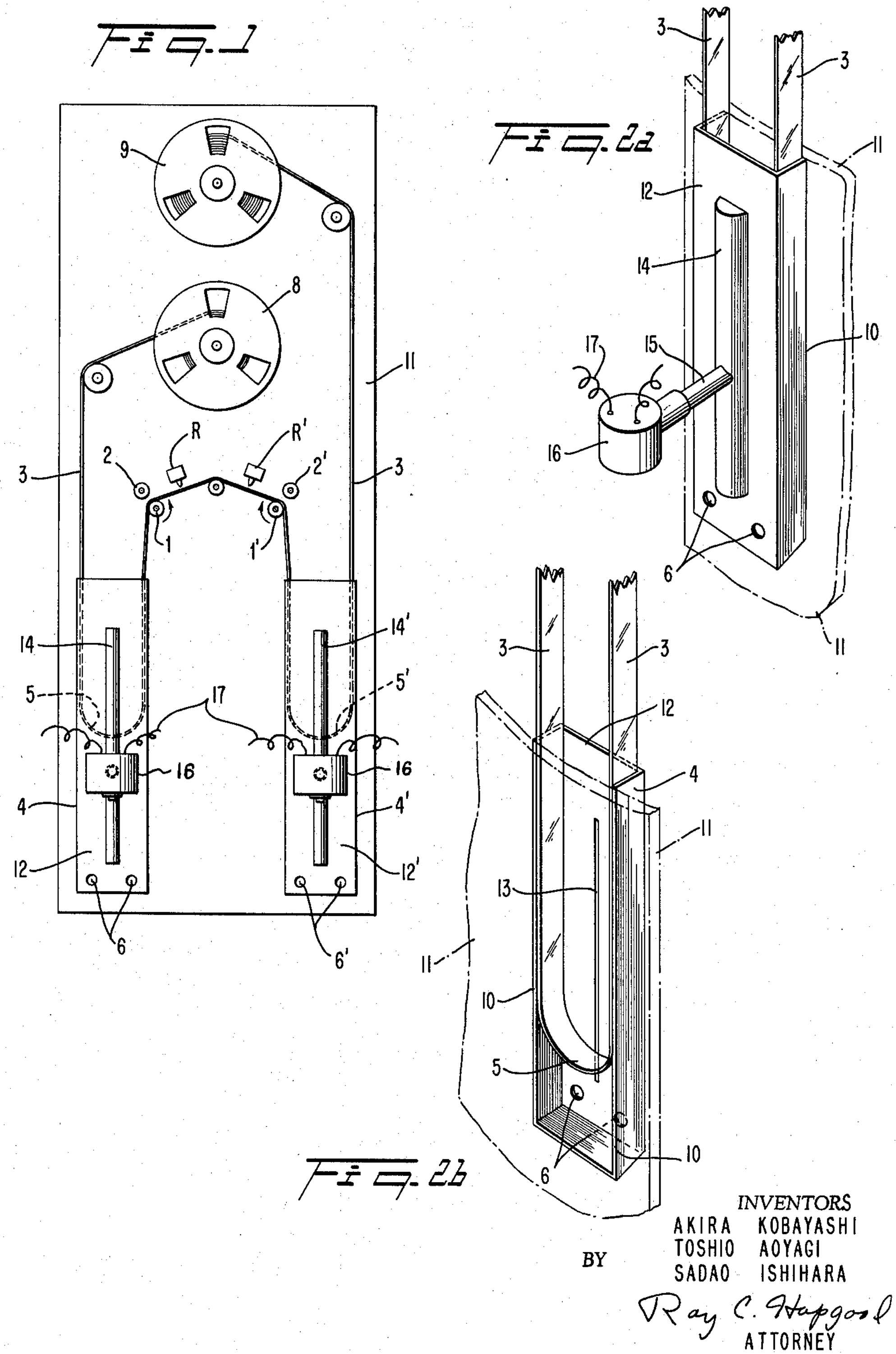
FIG. 1 is a front view of a prior art tape unit containing two loops of slack tape.
FIG. 2A is a front perspective view of a prior art mechanism for detecting the length of a slack tape loop.
FIG. 2B is a rear perspective view of the prior art mechanism shown in FIG. 2A.

Referring to FIG. 1, the prior art tape feed mechanisms contained a first tape reel 8 and a second tape reel 9. Magnetic tape 3 is driven past magnetic reproducing heads R and R′ by means of continuously rotating capstans 1 and 1′ and their opposing pinch rollers 2 and 2′. Capstans 1 and 1′ rotate in opposing directions, as indicated by the arrows in FIG. 1, such that tape 3 is driven to the left when pinch roller 2 is pressed against capstan 1 and to the right when pinch roller 2′ is pressed against capstan 1′. Loops of slack tape 5 and 5′ are provided between the drive capstans and the two reels. These slack tape loops are formed in boxes 4 and 4′, which are open at the top and which contain air outlets 6 and 6′ at the bottom. Suction in applied to air outlets 6 and 6′ to draw tape 3 down into boxes 4 and 4′ to form slack tape loops 5 and 5′. The suction also provides the necessary tension in tape 3 to maintain proper operating conditions.

In this prior art tape unit, reels 8 and 9 are controlled by the length of slack tape in the tape loop adjacent thereto and are driven in such manner as to maintain a constant length of slack tape in the corresponding slack tape loop. This, of course, requires some means of detecting and measuring the length of the slack tape loop in boxes 4 and 4′. FIGS. 2A and 2B show the mechanism which was used in the prior art to perform this necessary measurement. As shown in FIGS. 1, 2A, and 2B, box 4 contains a front plate 12 which is attached to the face plate 11 of the tape unit by means of three edge members 10 such that face plate 11 forms the back plate of box 4. An air slit 13 is formed in front plate 12 extending above and below the normal position of the tape loop. Slit 13 is covered on the outside of face plate 12 by a housing 14, which is attached to a pressure transducer 16 by means of an air hose 15. Since the air above tape loop 5 is at atmospheric pressure, and the air below tape 5 is below atmospheric pressure, the pressure within housing 14 will fall somewhere between these two pressures depending on the position of tape loop 5. If tape loop 5 rises, the pressure in housing 14 will fall, and if tape loop 5 falls, the pressure in housing 14 will rise. The pressure in housing 14 is transformed into an electrical signal by transducer 16 and applied to a reel motor control circuit, which is not shown, via conductors 17. The motor control circuit is adapted to turn the reels in one direction when the output signal of transducer 16 rises above a first threshold level and to turn the reel in the other direction when the output signal of transducer 16 falls below a second threshold level. These threshold levels, of course, correspond to an upper and lower limit for the length of slack tape loop 5, and the reel drive directions are chosen to hold the slack tape loop between these limits under all conditions.

In the above described prior art circuit, the tape is driven in one direction or the other by actuating the corresponding pinch roller 2 or 2′, and reels 8 and 9 are automatically driven by the change in the slack tape loops which occur when the pinch rollers are actuated. This prior art mechanism, however, has a serious defect in its mechanism for detecting the length of the slack tape loop. The output signal of transducer 16 not only varies in accordance with the position of the tape loop, but also in accordance with the magnitude of suction applied to air outlets 6. Since it is very difficult to hold the suction constant, this mechanism is therefore subject to misoperation because of fluctuations in the suction applied to air outlets 6.

Figure 3A:
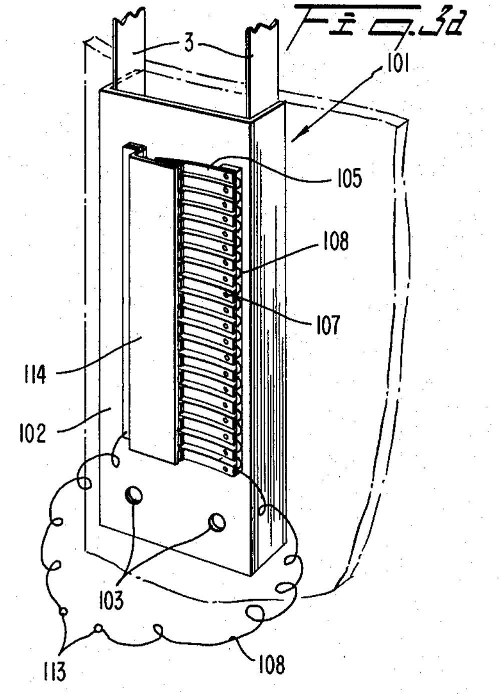
FIG. 3A is a front perspective view of one novel mechanism for detecting the length of a slack tape loop in accordance with this invention.
Figure 3B:
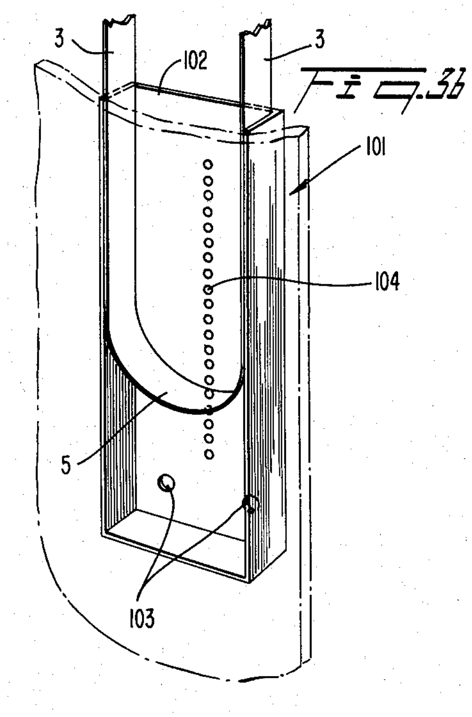
FIG. 3B is a rear perspective drawing of the novel mechanism shown in FIG. 3A.
Figure 4A:
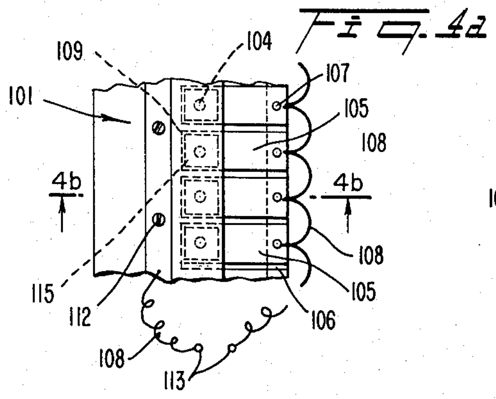
FIG. 4A is an enlarged plan view of a portion of the mechanism shown in FIG. 3B.
Figure 4B:
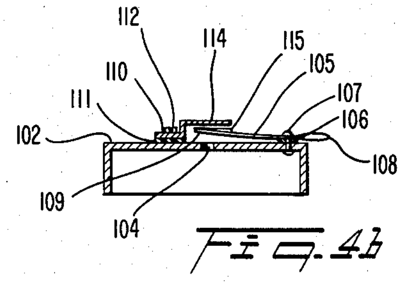
FIG. 4B is a sectional view taken on the line 4B—4B of FIG. 4A.

FIGS. 3A and 3B show one embodiment of this invention, which avoids the disadvantages of the prior art mechanisms by using a different method of measuring the length of the slack tape loop. The mechanism of this invention contains a box structure 101 with air outlets 103, similar to the prior art mechanisms, but instead of a slit, the front plate 102 of this invention has a row of holes 104. A movable arched metallic spring electrode 105 extends over each hole 104. Electrodes 105 are fixed by a screw 107 to back plate 102 via an insulator 106 as shown in FIG. 4. The free end 109 of electrodes 105 bear against an extension 114 of a fixed metallic electrode 110, which is attached to front plate 102 via an insulator 111 by screws 112. On the upper edge of spring electrodes 105, a dielectric membrane 115 which is an electric insulator is provided. It can be seen by those skilled in the art that spring 105, membrane 115, and electrode 110 comprise a variable capacitance whose exact capacity varies in accordance with the position of spring 105. Each of the spring electrodes 105 are connected together in parallel by a conductor 108 to form a composite capacitor containing all of the individual capacitors. The output of this composite capacitor is taken between terminals 113.

In this embodiment of the invention, suction is applied to air outlets 103 as in the prior art to draw a slack tape loop 5 down into box 101. As in the prior art, the pressure above slack tape loop 5 is equal to atmospheric pressure and the pressure below slack tape loop 5 is lower than atmospheric pressure. Therefore all of the condenser spring electrodes 105 which are below the slack tape loop will be drawn against front plate 104 and all which are above the slack tape loop will be in the position shown in FIG. 4B. It will be apparent to those skilled in the art that the capacity between terminals 113 will therefore vary in step fashion as the tape is raised and lowered, and that this capacitance will be independent of the suction applied to air outlets 106. Thus the tape detecting mechanism of this invention provides a true indication of the length of the slack tape loop.

Figure 5:
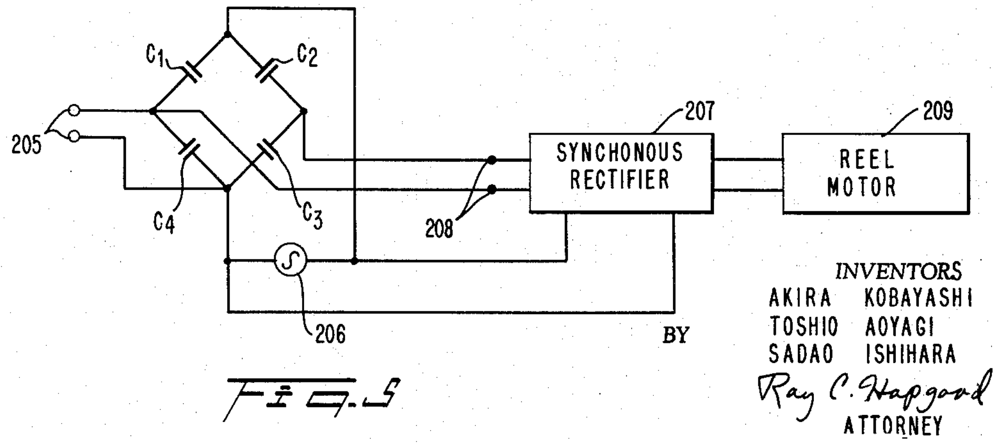
FIG. 5 is a partial schematic diagram of a feed motor control circuit used in connection with the mechanism shown in FIGS. 3A, 3B, 4A, and 4B.

The total capacity of the above described variable capacitor can be transformed into a driving voltage for the tape reels by the circuit shown in FIG. 5, in which the terminals 113 of the capacitor are coupled to input terminals 205 of the circuit, and in which an output voltage for the tape reel motor 209 is taken from output terminals of the circuit. The circuit comprises an A.C. voltage source 206, a synchronous rectifier 207, and a capacitance bridge containing capacitors $C_1$, $C_2$, $C_3$, and $C_4$. The values for the capacitors is selected in accordance with the equation $$C_1C_3=C_2(C_0+C_4) \tag{1}$$

where $C_0$ is the capacitance at terminals 113 when the slack tape loop is equal to its desired length. This particular relation among the capacitors assures that the output of synchronous rectifier 207 will be zero when the slack tape loop is at its desired length, as will be readily apparent to those skilled in art. When the length of the slack tape loop is changed, however, the capacitance at terminals 205 will change by $\pm\Delta C$, where the polarity of the change in capacitance is dependent on whether the loop is lengthened or shortened. When $$(C_1+C_4+C_0)>|\Delta C|$$

the amplitude V of the voltage at terminals 208 is given by the equation $$V=\frac{EC_2}{(C_1+C_4+C_0)(C_2+C_3)}|\Delta C| \tag{2}$$

where E is the voltage output of A.C. voltage source 206 and the phase of voltage V is determined by the polarity of $\Delta C$. From Equation 2 it will be apparent that the output voltage of synchronous rectifier 207 is proportioned to $\Delta C$, which in turn is proportional to the change in length of the slack tape loop, and that the phase of the output voltage depends upon whether the slack tape loop has been lengthened or shortened. Thus reel motor 209 will be driven in the proper direction at the proper speed to maintain the length of the slack tape loop constant within relatively narrow limits.

From the foregoing description it will be apparent that this invention provides a novel mechanism which detects the true length of a slack tape loop substantially independent of the amount of suction applied to the air inlet thereof. And it should be understood that this invention is by no means limited to the specific embodiment disclosed herein, since many modifications can be made in the structure disclosed without departing from the basic teaching of this invention. For example, although the dielectric membrane 115 is shown to be attached to spring electrode 105 in FIG. 4B, it will be apparent to those skilled in the art that the membrane could be attached to fixed electrode 114 to reduce the weight of spring 105. This and many other modifications will be apparent to those skilled in the art, and this invention includes all modifications falling within the scope of the following claims.

We claim:

1. A tape drive mechanism comprising first and second reel means adapted to receive opposing ends of a continuout tape, reel drive motor means coupled to said first and second reel means, a slack tape loop container having an open end, a closed end, and side members communicating between said ends, air outlet means attached to said container, and said container being adapted to receive a loop of tape through the open end thereof and being adapted to draw said loop of tape into said container in response to suction applied to the air outlet thereof, a plurality of openings formed in one side of said container, a plurality of pressure switch elements positioned on said one side of said container over a corresponding one of said air openings, each of said pressure switch elements being adapted to be actuated by said suction applied to said air outlet, each of said pressure switch elements containing a variable capacitor having a first capacitance value when said pressure switch element is unactuated and a second capacitance value when said pressure switch element is actuated, a capacitance responsive circuit coupled in parallel to each of said capacitors, said capacitance responsive circuit being operable to produce a first output signal when the total capacitance of said capacitors rises above a predetermined value and being operable to produce a second output signal when the total capacitance of said capacitors falls below a predetermined value, and a motor control circuit coupled between said capacitance responsive circuit and said reel drive motor means, said motor control circuit being operable to drive said reel drive motor means in one direction in response to said first output signal and in the other direction in response to said second output signal, thereby maintaining a relatively constant length of slack tape within said container.

2. The combination defined in claim 1 wherein said capacitance responsive circuit and said motor control circuit comprise an A.C. power source, a synchronous rectifier coupled to said A.C. power source, and a capacitance bridge coupled between said synchronous rectifier and said A.C. power source, said capacitance bridge circuit being coupled in parallel to each of said capacitors and being adapted to shift the phase of the output signal of said synchronous rectifier when the total capacitance of said capacitors rises above a predetermined value, and the output of said synchronous rectifier circuit being coupled to said reel motor means.

3. The combination defined in claim 2 wherein said capacitance bridge comprises four capacitors $C_1$, $C_2$, $C_3$, and $C_4$, one terminal of capacitor $C_1$ being coupled to one terminal of capacitor $C_2$ and the other terminal of capacitor $C_1$ being coupled to one terminal of capacitor $C_4$, the other terminal of capacitor $C_2$ being coupled to one terminal of capacitor $C_3$, and the other terminal of capacitor $C_3$ being coupled to the other terminal of capacitor $C_4$, said pressure switch capacitors being coupled in parallel across capacitor $C_4$, said A.C. power source being coupled between said other terminal of capacitor $C_4$ and said one terminal of capacitor $C_2$, said synchronous rectifier being coupled between said one terminal of capacitor $C_2$ and said other terminal of capacitor $C_4$, and the capacitance value of said capacitors being related to each other in accordance with the equation $C_1C_3=C_2(C_0+C_4)$ where $C_0$ is said predetermined value of capacitance for said pressure switch capacitors.

4. A slack tape loop detector mechanism comprising a container having an open end and a closed end and side members communicating thereinbetween, said container being adapted to receive a loop of tape through the open end thereof and being approximately equal in width to the width of said tape, an air outlet formed near the closed end of said container, a plurality of openings formed in one side of said container along a line extending between said open and said closed end thereof, a plurality of pressure switch elements each positioned over a corresponding one of said plurality of openings, said pressure switch elements being adapted to be actuated by suction applied to said air outlet, each of said pressure switch elements containing a variable capacitor which has a first value of capacitance when said switch element is unactuated and a second value of capacitance when said switch element is actuated, said capacitors being connected together in parallel, said suction being operable to draw said loop of tape down into said container, and said container being adapted to substantially confine said suction to the space between said tape and the closed end of said container whereby the total capacitance of said capacitors is a measure of the length of said tape loop.

5. The combination defined in claim 4 wherein each of said pressure switch elements comprises a movable electrode member mounted over the corresponding opening, said movable electrode member being normally positioned away from said opening and being operable to move toward said opening in response to said suction, a fixed electrode member mounted over said spring electrode member, and a dielectric material separating said movable member from said fixed member.

6. The combination defined in claim 5 wherein said movable electrode comprises a spring member attached at one end to said container and being free to move at the other end thereof, the free end of said spring member being positioned over said opening and being adapted to move theretoward in response to said suction, and wherein said fixed electrode comprises a fixed member attached to said container and positioned over the free end of said spring member.

References Cited in the file of this patent

UNITED STATES PATENTS

| | | |
|---|---|---|
| 2,921,753 | Lahti et al. | Jan. 19, 1960 |
| 2,952,415 | Gilson | Sept. 13, 1960 |
| 3,057,569 | Weidenhammer | Oct. 9, 1962 |